United States Patent [19]

Pritchard

[11] 4,310,245

[45] Jan. 12, 1982

[54] INTERFEROMETER SYSTEM

[76] Inventor: James L. Pritchard, 52 Needham St., Norfolk, Mass. 02056

[21] Appl. No.: 131,753

[22] Filed: Mar. 19, 1980

[51] Int. Cl.³ .............................................. G01B 9/02
[52] U.S. Cl. ................................................ 356/345
[58] Field of Search .............................. 356/345, 346

[56] References Cited

U.S. PATENT DOCUMENTS 3,708,229  1/1973  Pircher .................................. 356/355
3,936,193  2/1976  Auth ..................................... 356/346
4,084,907  4/1978  Pinard .................................. 356/346

Primary Examiner—John K. Corbin
Assistant Examiner—Bruce Y. Arnold
Attorney, Agent, or Firm—John F. McClellan, Sr.

[57] ABSTRACT

System for simplifying adjustment of Michelson type interferometers using white light beam to establish point of zero optical path difference in data beam, includes simultaneous adjustment of the white light beam and the data beam with a unitary reflecting surface at the $M_1$ position, and phasing of the white light beam relative to the data beam by interposition of a transparent optical plate in the white light beam but out of the data beam and providing varying of optical thickness of the white light beam relative to the data beam through rotation of the optical plate.

1 Claim, 2 Drawing Figures

INTERFEROMETER SYSTEM

This invention relates generally to interferometric systems and particularly to interferometer calibration using a time-delay plate in a new co-action in establishing zero path difference.

THE PROBLEM

Establishing the zero path difference of the data beam in the Michelson interferometer has remained a difficult problem in spite of the historical and continuing importance of this interferometer: "It is probable that no single instrument has more profoundly influenced modern physics than the Michelson interferometer (1881)", states the Encyclopedia Brittanica, 1966 Edition, Vol. 12 p. 355. Yet so far as is known the practice of determining zero O.P.D. still involves comparing some rather large fixed members of data samples and correcting all data to restore symmetry.

R. W. Wood in his "Physical Optics", third edition at page 292 and following described the use of both a white gas flame and a sodium flame in adjusting a Michelson interferometer. The present invention provides reference radiation for easier visibility and counting in setting zero O.P.D. of the data beam, but in a different channel in the Michelson arrangement from the data channel, in contrast with the Wood description.

The invention contemplates the use of at least two and preferably three channels: white light, data or main, and laser, in accordance with known practice to permit efficient phasing and servo-control counting, but provides different apparatus and method of phasing. Two channels are used for simplicity in exposition.

As is known, the purpose of the white light signal is to mark a certain fixed distance in front of the point of zero Optical Path Difference (O.P.D.) for the data channel or main channel. This would be unnecessary in a perfect interferometer because the interferogram produced would be perfectly symmetric about the point of zero O.P.D. In reality no interferometer is perfect, and hence the interferogram produced is less than perfectly symmetric about zero O.P.D. As result, before useful analysis can be done on the interferogram it must be corrected for imperfections in the system. There are two reasons for determining this point. The first reason for doing this is to establish a reference point for co-addition of the interferograms so that the signal-to-noise of the interferogram can be enhanced. Very often the interferogram is taken at up to speeds of 1 cm (O.P.D.)/1 sec. with poorly illuminated sources necessitating a buildup of interferograms to enhance the signal-to-noise of the spectrum. There is a definite connection between the signal-to-noise of the interferogram and the resulting spectrum. Thus, we have one reason for its use. The second reason for its use is to permit the taking of the even part (or odd, but not both) of the Fourier transform. The interferogram is an even function except for the non-linear characteristic of the dispersion in the beamsplitter and compensator. Since it is essentially an even function it requires little correcting (phase change), and this can be done in a computer. However, this correcting necessitates having a fiducial marker. As indicated, this fiducial marker is established by comparing some fixed number of samples, for example 128 samples before the point of zero O.P.D., to the same fixed number of samples after the point of zero O.P.D. correcting all data to restore symmetry.

The way that this was accomplished in the prior art was by having the fixed mirror for the white light channel advanced forward of the fixed mirror for the main channel by the appropriate distance.

The manner in which the fixed mirror for the white light channel was advanced the appropriate distance was as follows. The mirror for the white light channel was affixed to a screw mechanism bolted to the plate which also held the fixed mirror for the main channel. Once bolted to the plate, the mirror had to be adjusted in two ways: it had to be placed in the right plane and it had to be adjusted the right distance ahead of the main channel mirror. Each of these two adjustments would tend to undo the other, so making both of them required something of an iterative process. Further the adjusting to the right distance was accomplished by screwing the mirror in or out, so that in adjusting the distance the user had to translate distance into turns of the screw, and allow for slack in the screw, which was to some extent an unknown factor. On the whole, this made alignment of the white light channel a tedious and time consuming process. Further, the white light channel came out of alignment periodically with changes in environment, requiring readjustment.

THE SOLUTION

The following method is proposed as an alternative. If you were to place a piece of optically transparent material such as a glass plate between the moving mirror and the beamsplitter in the white light channel, the effect would be to lengthen the time (ergo the number of laser zero crossing and the optical path distance) required for the white light signal to pass from the beamsplitter to the moving mirror, and to get back. This would result from the fact that the optically transparent material would be optically denser than the air, so the light would go slower through the material than the air. Instead of having two different mirror surfaces on the fixed mirror plate, one for the main channel and one for the white light channel, one mirror surface would be used for both. The optical distance from the beamsplitter to the fixed white light mirror and the optical distance to the fixed main channel mirror are the same, but the optical distance from the beam-splitter to the moving mirror along the white light channel is greater than the optical distance to the moving mirror along the main channel. Therefore the moving mirror, in order to be at the point of zero optical path difference for the white light must be closer to the beamsplitter than it will have to be at the point of zero optical path difference for the main channel. So, by using the right thickness for the optically transparent material the white light signal it will be possible to mark the appropriate distance in front of the point of zero optical path difference for the main channel. Further, if the piece of material is turned on an angle away from the normal to the white light path, the distance through the material is increased and thus the optical distance from the beamsplitter to the moving mirror along the white light channel is also increased. Therefore the optical distance along the white light channel from the beamsplitter to the moving mirror can be finely adjusted or altered by adjusting the angle of the piece of optically transparent material. This takes the place of adjusting this distance of the fixed white light mirror from the fixed main channel mirror. The adjusting of the planar position of fixed white light mirror is eliminated in that it is accomplished when the fixed main channel mirror is adjusted planarly. Use of this method would save much time and effort at alignment time and readjustment time.

Thus although compensator plates have been known and used in the data channel for a long time the combination and advantages set forth with the present arrangement are believed new and signficant in overcoming a prior art problem endured for almost one hundred years.

In a certain sense, the plate in the path of the reference white light is a "non compensator" plate. The resulting beam of light is delayed and dispersed because of this plate. It will cause the interferogram to be somewhat more distorted but will preserve the essential feature of it. That is to say, the central maximum will be preserved. This central maximum of the white light is what we use for triggering of the signal with a voltage comparator.

In brief summary given for cursive description only and not as limitation, the invention includes means for adjusting the time delay of a reference white light beam relative to a data beam, including an optical plate in the white light reference beam channel but out of the data beam channel, means for moving the optical plate and varying the optical thickness thereof relative to the reference beam channel, and means for simultaneously adjusting the data beam channel and the reference beam channel.

These and other objects and advantages of this invention will become more readily apparent on examination of the following description, including the drawings in which like reference numerals refer to like parts:

OLD ART

Figure 1:
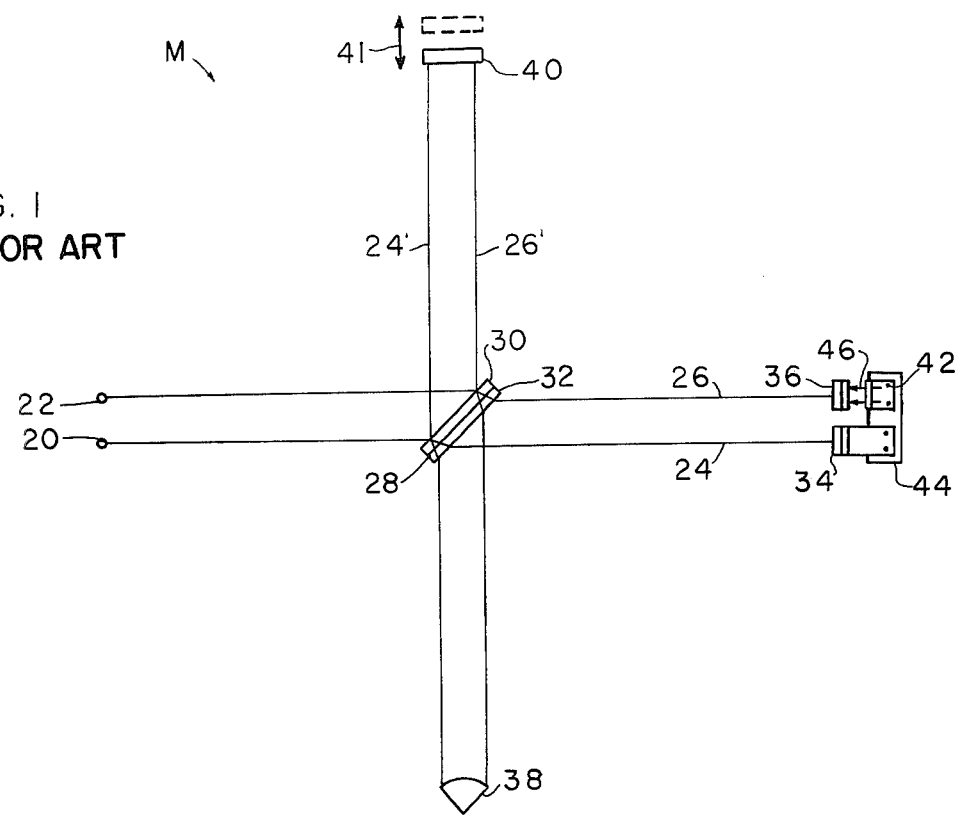
FIG. 1 is a plan diagram of an old art arrangement.

FIG. 1 diagrams the old-art arrangement of a Michelson interferometer M with data source 20 and reference or white light source 22 projecting respective beams 24, 26 through beamsplitter 28 and compensator plates 30, 32 onto fixed mirror assembly 34, 36 and return from the dielectric or half-silvered beamsplitter surface to suitable detectors or detector 38. Similarly the beams 24', 26' reflected at the beamsplitter to moving mirror 40 return through the beamsplitter to the detector means.

To obtain the benefit of the white light beam in setting zero optical path difference for the data channel it is necessary to adjust the fixed mirror 36 for the white light beam to a position ahead of the fixed mirror 34 for the data beam by a finite amount, while maintaining mirror 36 in a plane parallel with the plane of mirror 34. This adjustment requires utmost delicacy throughout, regardless of the mirror mountings used.

As schematically indicated, mirror 36 may have a bolted attachment 42 to a fixed part 44 of the interferometer which also carries mirror 34, and may have any common adjustment setting mechanism such as a screw-advance mechanism, indicated by the arrows 46.

THE INVENTION

Figure 2:
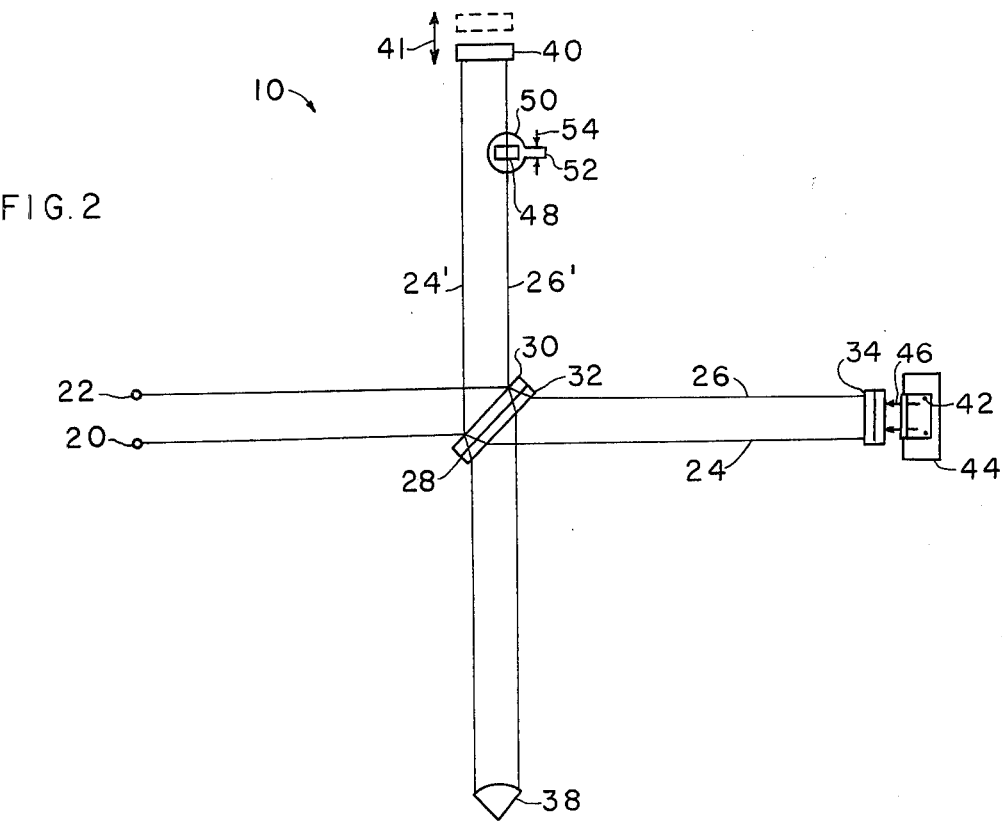
FIG. 2 is a plan diagram of the present invention.

FIG. 2 diagrams the present invention 10 in similar plan view. The same data source 20, white light source 22, beams 24, 26, 24', 26', beamsplitter 28, compensator plates 30, 32, moving mirror 40 and moving means (arrow) 41, and detector 38 are indicated.

However, this invention provides in co-acting combination two features: the white light channel has between the beamsplitter and the moving mirror an optical thickness adjustable delay plate 48, preferably on a pivotal mount 50, and the fixed mirror or M-mirror 34' is unitary, the same reflecting surface being used for the white light and data channels.

The data channel compensator plate is preferably fixed to avoid changing the field. According to the present invention this difficulty can be ignored in the white light channel, so that the optical thickness of the white light channel adjustable delay plate 48 can be adjusted easily but delicately by adjusting the angle. A conventional pivot-arm 52 driven by a set 54 of opposed screws can be used for rotating the pivotal mount, which may be cylindrical and set in a fitting hole in the frame.

This invention is not to be construed as limited to the particular forms disclosed herein, since these are to be regarded as illustrative rather than restrictive. It is, therefore, to be understood that the invention may be practiced within the scope of the claims otherwise than as specifically described.

What is claimed and desired to be protected by U.S. Letters Patent is:

1. In a system having in Michelson interferometer arrangement, the following components defining a data channel and a reference beam channel:
   a data beam source,
   a reference beam source,
   a beam-splitter,
   a fixed mirror assembly with adjustment means therefor,
   a moving mirror and means for moving same,
   detector means
   and means for adjusting phase delay,
   the improvement comprising:
   said means for adjusting phase delay consisting of means for adjusting phase delay of said reference beam relative to said data beam in establishing zero optical path difference to the data beam, including a transparent optical plate in the reference beam channel but out of the data beam channel, means providing for rotating the transparent optical plate for increasing the optical thickness thereof relative to the reference beam channel, means for simultaneously adjusting the reference beam and the data beam, including said fixed mirror being unitary and in both the data beam channel and the reference beam channel and having adjustment thereon, said transparent optical plate being plane-parallel in configuration and located between said beamsplitter and said moving mirror.

* * * * *